(12) United States Patent
Jordan et al.

(10) Patent No.: US 9,934,623 B2
(45) Date of Patent: Apr. 3, 2018

(54) REAL-TIME DATA ACQUISITION AND RECORDING SYSTEM

(71) Applicant: Wi-Tronix, LLC, Bolingbrook, IL (US)

(72) Inventors: Lawrence B. Jordan, Bolingbrook, IL (US); Mathew Hamsmith, Bolingbrook, IL (US)

(73) Assignee: Wi-Tronix LLC, Bolingbrook, IL (US)

( * ) Notice: Subject to any disclaimer, the term of this patent is extended or adjusted under 35 U.S.C. 154(b) by 0 days.

(21) Appl. No.: 15/595,650

(22) Filed: May 15, 2017

(65) Prior Publication Data
US 2017/0330392 A1    Nov. 16, 2017

Related U.S. Application Data

(60) Provisional application No. 62/337,227, filed on May 16, 2016, provisional application No. 62/337,225, (Continued)

(51) Int. Cl.
*G11C 7/10* (2006.01)
*G07C 5/00* (2006.01)
(Continued)

(52) U.S. Cl.
CPC ............. *G07C 5/008* (2013.01); *G06F 13/14* (2013.01); *G06F 12/02* (2013.01); *G08C 17/02* (2013.01)

(58) Field of Classification Search
CPC ......... G07C 5/008; G06F 13/14; G06F 12/02; G08C 17/02
(Continued)

(56) References Cited

U.S. PATENT DOCUMENTS 5,065,321 A    11/1991   Bezos et al.
5,377,497 A    1/1995    Powell
(Continued)

FOREIGN PATENT DOCUMENTS

CA    2689423    12/2015
CN    102123274  3/2013
(Continued)

OTHER PUBLICATIONS http://www.nbcnews.com/storyline/egyptair-crash/some-airlines-stream-black-box-data-cost-keeps-others-offline-n580966?cid=eml_onsite.

*Primary Examiner* — Fernando Hidalgo
(74) *Attorney, Agent, or Firm* — Mercedes V. O'Connor; Rockman Videbeck & O'Connor

(57) ABSTRACT

A data acquisition and recording system (DARS) for mobile assets that includes a data recorder. The data recorder includes a data encoder, an onboard data manager, a vehicle event detector, at least one local memory component, and a queueing repository. DARS processes data from at least one input sensor and stores a compressed record of the data at least once per second in the local memory module. DARS is designed to run in near real-time mode, storing a full record comprising five minutes of data to a remote memory module every five minutes, and in real-time mode, streaming data to the remote memory module by uploading a record of data at least once per second and up to once every tenth of a second. Remotely located users can view video, audio, and data acquired by DARS through a web browser, which provides for quicker emergency response, validate the effectiveness of repairs and rerouting, and monitor crew performance and safety.

54 Claims, 7 Drawing Sheets

Related U.S. Application Data filed on May 16, 2016, provisional application No. 62/337,228, filed on May 16, 2016.

(51) Int. Cl.
 *G06F 13/14* (2006.01)
 *G08C 17/02* (2006.01)
 *G06F 12/02* (2006.01)

(58) Field of Classification Search
 USPC .......................... 365/189.05, 189.011, 189.17
 See application file for complete search history.

(56) References Cited

U.S. PATENT DOCUMENTS

| | | |
|---|---|---|
| 5,440,336 A | 8/1995 | Buhro et al. |
| 5,455,684 A | 10/1995 | Fujinami et al. |
| 5,638,299 A | 6/1997 | Miller |
| 6,109,532 A | 8/2000 | Schindler et al. |
| 6,263,268 B1 | 7/2001 | Nathanson |
| 6,308,044 B1 | 10/2001 | Wright et al. |
| 6,392,692 B1 | 5/2002 | Monroe |
| 6,496,777 B2 | 12/2002 | Tennison et al. |
| 6,659,861 B1 | 12/2003 | Faris et al. |
| 6,892,167 B2 | 5/2005 | Polan et al. |
| 6,915,190 B2 | 7/2005 | Galasso |
| 7,302,323 B2 | 11/2007 | Anderson et al. |
| 7,440,848 B2 | 10/2008 | Anderson |
| 7,640,083 B2 | 12/2009 | Monroe |
| 7,755,479 B2 | 7/2010 | Webb, Sr. |
| 7,761,544 B2 | 7/2010 | Manasseh et al. |
| 7,924,153 B1 | 4/2011 | Furey et al. |
| 7,953,425 B2 | 5/2011 | Jordan |
| 8,081,214 B2 | 12/2011 | Vanman et al. |
| 8,589,994 B2 | 11/2013 | Monroe |
| 8,612,170 B2 | 12/2013 | Smith et al. |
| 8,625,878 B2 | 1/2014 | Haas et al. |
| 8,768,534 B2 | 7/2014 | Lentz |
| 8,798,148 B2 | 8/2014 | Kostrzewski et al. |
| 8,942,426 B2 | 1/2015 | Bar-Am |
| 8,979,363 B2 | 3/2015 | Groeneweg et al. |
| 9,003,052 B2 | 4/2015 | Holstein |
| 9,031,791 B2 | 5/2015 | Nedilko et al. |
| 9,049,433 B1 | 6/2015 | Prince |
| 9,050,984 B2 | 6/2015 | Li et al. |
| 9,191,053 B2 | 11/2015 | Ziarno et al. |
| 9,235,765 B2 | 1/2016 | Bentley et al. |
| 9,260,122 B2 | 2/2016 | Haas et al. |
| 9,260,199 B2 | 2/2016 | Sundararajan et al. |
| 9,285,294 B2 | 3/2016 | Jordan et al. |
| 9,285,295 B2 | 3/2016 | Jordan et al. |
| 9,313,276 B2 | 4/2016 | Pereira |
| 9,346,476 B2 | 5/2016 | Dargy et al. |
| 9,500,545 B2 | 11/2016 | Smith et al. |
| 2003/0152145 A1 | 8/2003 | Kawakita |
| 2004/0027255 A1 | 2/2004 | Greenbaum |
| 2004/0039504 A1 | 2/2004 | Coffee et al. |
| 2006/0276943 A1 | 12/2006 | Anderson et al. |
| 2007/0076312 A1 | 4/2007 | Jordan |
| 2008/0176583 A1 | 7/2008 | Brachet et al. |
| 2009/0102638 A1 | 4/2009 | Olsen et al. |
| 2010/0023201 A1 | 1/2010 | Kinney et al. |
| 2013/0274954 A1 | 10/2013 | Jordan, Jr. et al. |
| 2013/0307693 A1 | 11/2013 | Stone et al. |
| 2014/0052315 A1 | 2/2014 | Isailovski et al. |
| 2014/0285337 A1 | 9/2014 | Gebhardt |
| 2014/0347481 A1 | 11/2014 | Kostrzewski et al. |
| 2015/0009331 A1 | 1/2015 | Venkatraman |
| 2015/0094885 A1 | 4/2015 | Dargy et al. |
| 2015/0149118 A1 | 5/2015 | Jordan et al. |
| 2015/0185090 A1 | 7/2015 | Groeneweg et al. |
| 2015/0221141 A1 | 8/2015 | Negritto |
| 2015/0225002 A1 | 8/2015 | Branka et al. |
| 2015/0339863 A1 | 11/2015 | Allwardt et al. |
| 2015/0363981 A1 | 12/2015 | Ziarno et al. |
| 2016/0046308 A1 | 2/2016 | Chung et al. |
| 2016/0073346 A1 | 3/2016 | Nicks et al. |
| 2016/0075443 A1 | 3/2016 | Schmutz et al. |
| 2016/0131483 A1 | 5/2016 | Jordan et al. |
| 2016/0365876 A1* | 12/2016 | Greenspan ........ H03M 13/2942 |

FOREIGN PATENT DOCUMENTS

| | | |
|---|---|---|
| WO | 2004019601 | 6/2004 |
| WO | 2006128124 | 11/2006 |
| WO | 2015150369 | 10/2015 |

\* cited by examiner

| Append to CHM Record Segment | Full Record Block | |
|---|---|---|
| Overwrite Temp CHM Location 1 | Interim Record Block | |
| <= 1 Second ... | | |
| Overwrite Temp CHM Location 2 | Interim Record Block | |
| <= 1 Second ... | | 5 Minutes |
| Overwrite Temp CHM Location 1 | Interim Record Block | |
| <= 1 Second ... | | |
| Overwrite Temp CHM Location 2 | Interim Record Block | |
| ... | | |

FIG. 5

| Append to CHM Record Segment | Full Record Block (2/1/2016 10:10:00 AM) |
|---|---|
| Overwrite Temp Loc. 1 | Interim Record Block (2/1/2016 10:10:01 AM) |
| Overwrite Temp Loc. 2 | Interim Record Block (2/1/2016 10:10:02 AM) |
| Overwrite Temp Loc. 1 | Interim Record Block (2/1/2016 10:10:03 AM) |
| Overwrite Temp Loc. 2 | Interim Record Block (2/1/2016 10:10:04 AM) |
| Overwrite Temp Loc. 1 | Interim Record Block (2/1/2016 10:10:05 AM) |
| Overwrite Temp Loc. 2 | Interim Record Block (2/1/2016 10:10:06 AM) |
| Overwrite Temp Loc. 1 | Interim Record Block (2/1/2016 10:10:07 AM) |
| Overwrite Temp Loc. 2 | Interim Record Block (2/1/2016 10:10:08 AM) |

602

| Power Loss | |
|---|---|
| Power Restored (2/3/2016 05:37:53 AM) | |
| Append to CHM Record Segment | Interim Record Block (2/1/2016 10:10:08 AM) |
| Temp Loc. 1 | Interim Record Block (2/3/2016 05:37:53 AM) |

FIG. 6

REAL-TIME DATA ACQUISITION AND RECORDING SYSTEM

CROSS-REFERENCE TO RELATED APPLICATION(S)

This application claims priority to U.S. Provisional Application No. 62/337,227, filed May 16, 2016, claims priority to U.S. Provisional Application No. 62/337,225, filed May 16, 2016, and claims priority to U.S. Provisional Application No. 62/337,228, filed May 16, 2016, to the extent allowed by law and the contents of which are incorporated herein by reference in their entireties.

TECHNICAL FIELD

This disclosure relates to equipment used in high value assets and particularly, to real-time data acquisition and recording systems used in high value mobile assets.

BACKGROUND

High value mobile assets such as locomotives, aircraft, mass transit systems, mining equipment, transportable medical equipment, cargo, marine vessels, and military vessels typically employ onboard data acquisition and recording "black box" systems and/or "event recorder" systems. These data acquisition and recording systems, such as event data recorders or flight data recorders, log a variety of system parameters used for incident investigation, crew performance evaluation, fuel efficiency analysis, maintenance planning, and predictive diagnostics. A typical data acquisition and recording system comprises digital and analog inputs, as well as pressure switches and pressure transducers, which record data from various onboard sensor devices. Recorded data may include such parameters as speed, distance traveled, location, fuel level, engine revolution per minute (RPM), fluid levels, operator controls, pressures, current and forecasted weather conditions and ambient conditions. In addition to the basic event and operational data, video and audio event/data recording capabilities are also deployed on many of these same mobile assets. Typically, data is extracted from data recorders, after an incident has occurred involving an asset and investigation is required, once the data recorder has been recovered. Certain situations may arise where the data recorder cannot be recovered or the data is otherwise unavailable. In these situations, the data, such as event and operational data, video data, and audio data, acquired by the data acquisition and recording system is needed promptly regardless of whether physical access to the data acquisition and recording system or the data is available.

SUMMARY

This disclosure relates generally to real-time data acquisition and recording systems used in high value mobile assets. The teachings herein can provide real-time, or near real-time, access to data, such as event and operational data, video data, and audio data, recorded by a real-time data acquisition and recording system on a high value mobile asset. One implementation of a method for processing, storing, and transmitting data from a mobile asset described herein includes receiving, using a data recorder onboard the mobile asset, data based on at least one data signal from at least one of: at least one data source onboard the mobile asset; and at least one data source remote from the mobile asset; encoding, using a data encoder of the data recorder, a record comprising a bit stream based on the data; appending, using an onboard data manager of the data recorder, the record to a record block; and storing, using the onboard data manager, the record block at a configurable first predetermined rate in at least one local memory component of the data recorder and a queueing repository of the data recorder.

Another implementation of a method for processing, storing, and transmitting data from a mobile asset described herein includes receiving data signals from at least one input sensor onboard the mobile asset; encoding a record comprising a bit stream based on the data signals; appending the record to a record block comprising a plurality of records; storing the record block to at least one local memory component onboard the mobile asset; and storing the record block to a remote memory component on a condition that the plurality of records comprises a predetermined amount of data.

One implementation of a real-time data acquisition and recording system described herein includes a data recorder onboard the mobile asset comprising at least one local memory component, a data encoder, an onboard data manager, and a queueing repository, the data recorder configured to receive data based on at least one data signal from at least one of: at least one data source onboard the mobile asset; and at least one data source remote from the mobile asset; the data encoder configured to encode a record comprising a bit stream based on the data; the onboard data manager configured to: append the record to a record block; and store the record block at a configurable first predetermined rate in the at least one local memory component and the queueing repository.

Another implementation of a system for processing, storing, and transmitting data from a mobile asset described herein includes a data encoder configured to receive data signals from at least one input sensor onboard the mobile asset and compress the data signals into a record comprising a bit stream; and an onboard data manager configured to: append the record to a record block comprising a plurality of records; store the record block in a crash hardened memory component onboard the mobile asset; and store the record block to a remote memory component on a condition that the plurality of records comprises a predetermined amount of data.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein:

FIG. 5 is a diagram that illustrates exemplary interim record blocks and full record blocks saved to a crash hardened memory module in accordance with implementations of this disclosure;

FIG. 6 is a diagram that illustrates exemplary interim record blocks in the crash hardened memory module prior to a power outage and after restoration of power in accordance with implementations of this disclosure.

DETAILED DESCRIPTION

Figure 1:
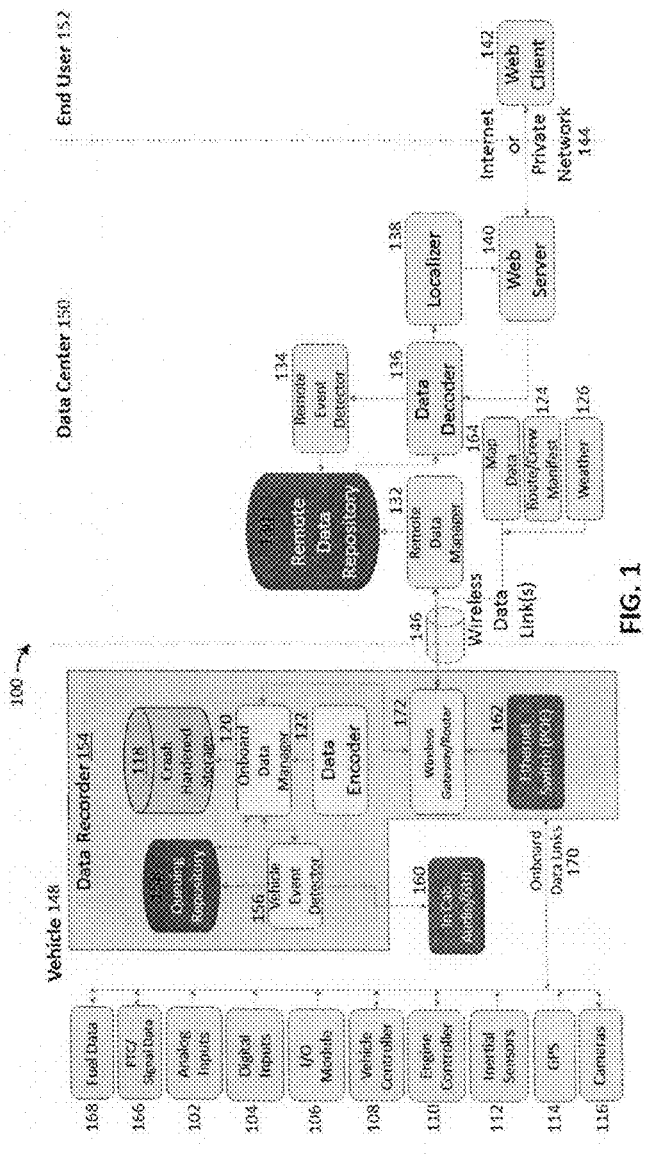
FIG. 1 illustrates a field implementation of a first embodiment of an exemplary real-time data acquisition and recording system in accordance with implementations of this disclosure.

A real-time data acquisition and recording system described herein provides real-time, or near real-time, access to a wide range of data, such as event and operational data, video data, and audio data, related to a high value asset to remotely located users such as asset owners, operators and investigators. The data acquisition and recording system records data, via a data recorder, relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data recorder on the asset to request a download of specific data, to locate and transfer files, and to use a custom application to view the data. The system of the present disclosure retains typical recording capability and adds the ability to stream data to a remote data repository and remote end user prior to, during, and after an incident. In the vast majority of situations, the information recorded in the data recorder is redundant and not required as data has already been acquired and stored in the remote data repository.

Prior to the system of the present disclosure, data was extracted from the "black box" or "event recorder" after an incident had occurred and an investigation was required. Data files containing time segments recorded by the "black box" had to be downloaded and retrieved from the "black box" and then viewed by a user with proprietary software. The user would have to obtain physical or remote access to the asset, select the desired data to be downloaded from the "black box," download the file containing the desired information to a computing device, and locate the appropriate file with the desired data using a custom application that operates on the computing device. The system of the present disclosure has eliminated the need for the user to perform these steps, only requiring the user to use a common web browser to navigate to the desired data.

A remotely located user, such as an asset owner, operator, and/or investigator, may access a common web browser to navigate to live and/or historic desired data relating to a selected asset to view and analyze the operational efficiency and safety of assets in real-time or near real-time. The ability to view operations in real-time, or near real-time, enables rapid evaluation and adjustment of behavior. During an incident, for example, real-time information and/or data can facilitate triaging the situation and provide valuable information to first responders. During normal operation, for example, real-time information and/or data can be used to audit crew performance and to aid network wide situational awareness.

Data may include, but is not limited to, analog and frequency parameters such as speed, pressure, temperature, current, voltage, and acceleration which originate from the asset and/or nearby assets, Boolean data such as switch positions, actuator position, warning light illumination, and actuator commands, global positioning system (GPS) data and/or geographic information system (GIS) data such as position, speed, and altitude, internally generated information such as the regulatory speed limit for an asset given its current position, video and image information from cameras located at various locations in, on or in the vicinity of the asset, audio information from microphones located at various locations in, on or in vicinity of the asset, information about the operational plan for the asset that is sent to the asset from a data center such as route, schedule, and cargo manifest information, information about the environmental conditions, including current and forecasted weather conditions, of the area in which the asset is currently operating in or is planned to operate in, asset control status and operational data generated by systems such as positive train control (PTC) in locomotives, and data derived from a combination from any of the above including, but not limited to, additional data, video, and audio analysis and analytics.

Figure 2:
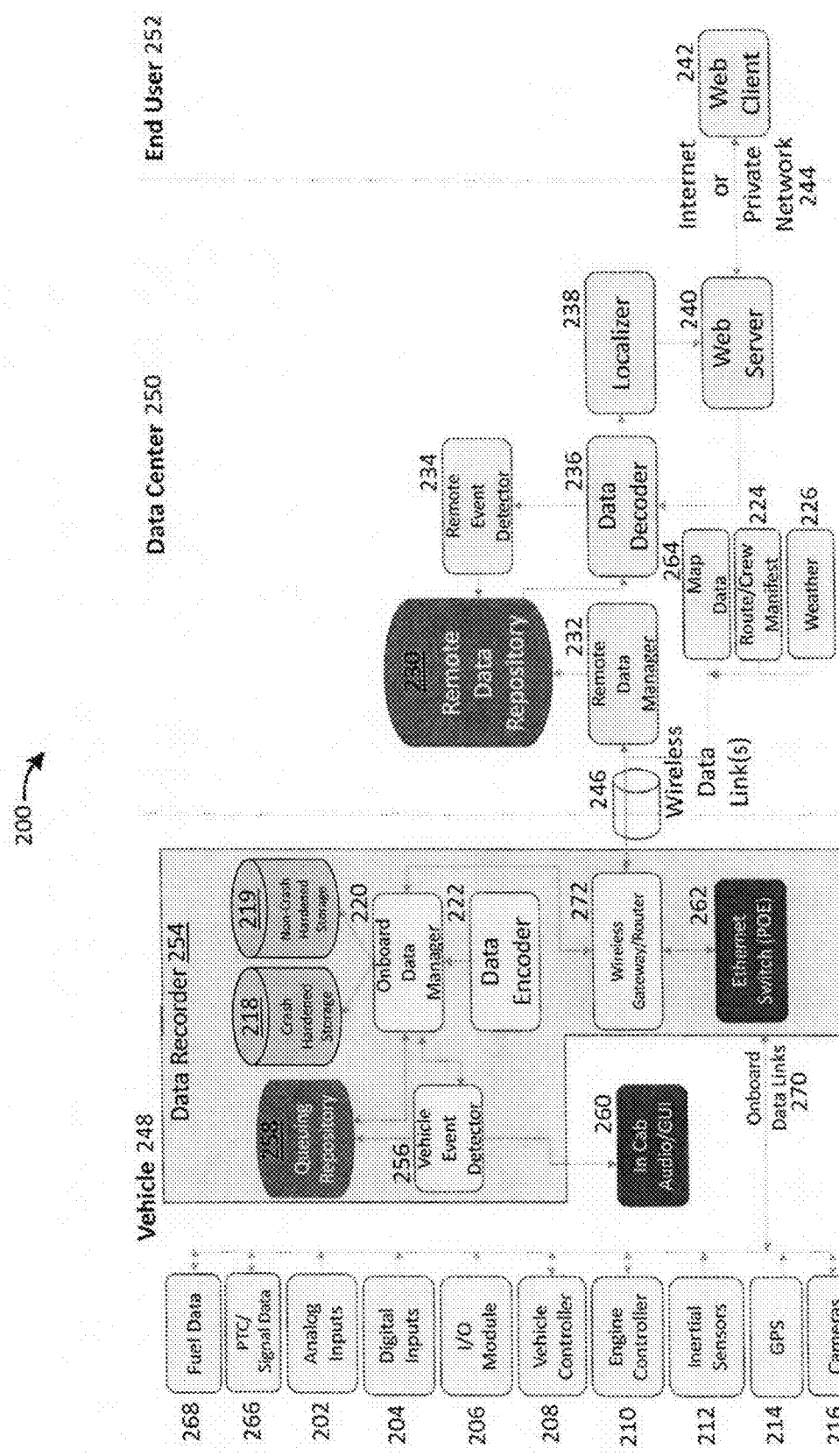
FIG. 2 illustrates a field implementation of a second embodiment of the exemplary real-time data acquisition and recording system in accordance with implementations of this disclosure.

FIGS. 1 and 2 illustrate a field implementation of a first embodiment and a second embodiment, respectively, of an exemplary real-time data acquisition and recording system (DARS) 100, 200 in which aspects of the disclosure can be implemented. DARS 100, 200 is a system that delivers real time information to remotely located end users from a data recording device. DARS 100, 200 includes a data recorder 154, 254 that is installed on a vehicle or mobile asset 148, 248 and communicates with any number of various information sources through any combination of onboard wired and/or wireless data links 170, 270, such as a wireless gateway/router, or off board information sources via a data center 150, 250 of DARS 100, 200 via data links such as wireless data links 146. Data recorder 154, 254 comprises an onboard data manager 120, 220, a data encoder 122, 222, a vehicle event detector 156, 256, a queueing repository 158, 258, and a wireless gateway/router 172, 272. Additionally, in this implementation, data recorder 154, 254 can include a crash hardened memory module 118, 218 and/or an Ethernet switch 162, 262 with or without power over Ethernet (POE). An exemplary hardened memory module 118, 218 can be, for example, a crashworthy event recorder memory module that complies with the Code of Federal Regulations and the Federal Railroad Administration regulations, a crash survivable memory unit that complies with the Code of Federal Regulations and the Federal Aviation Administration regulations, a crash hardened memory module in compliance with any applicable Code of Federal Regulations, or any other suitable hardened memory device as is known in the art. In the second embodiment, shown in FIG. 2, the data recorder 254 can further include an optional non-crash hardened removable storage device 219.

The wired and/or wireless data links 170, 270 can include any one of or combination of discrete signal inputs, standard or proprietary Ethernet, serial connections, and wireless connections. Ethernet connected devices may utilize the data recorder's 154, 254 Ethernet switch 162, 262 and can utilize POE. Ethernet switch 162, 262 may be internal or external and may support POE. Additionally, data from remote data sources, such as a map component 164, 264, a route/crew manifest component 124, 224, and a weather component 126, 226 in the implementation of FIGS. 1 and 2, is available to the onboard data manager 120, 220 and the vehicle event detector 156, 256 from the data center 150, 250 through the wireless data link 146, 246 and the wireless gateway/router 172, 272.

Data recorder 154, 254 gathers data or information from a wide variety of sources, which can vary widely based on the asset's configuration, through onboard data links 170, 270. The data encoder 122, 222 encodes at least a minimum set of data that is typically defined by a regulatory agency. In this implementation, the data encoder 122, 222 receives data from a wide variety of asset 148, 248 sources and data center 150, 250 sources. Information sources can include any number of components in the asset 148, 248, such as any of analog inputs 102, 202, digital inputs 104, 204, I/O module 106, 206, vehicle controller 108, 208, engine controller 110, 210, inertial sensors 112, 212, global positioning system (GPS) 114, 214, cameras 116, 216, positive train control (PTC)/signal data 166, 266, fuel data 168, 268, cellular transmission detectors (not shown), internally driven data and any additional data signals, and any of number of components in the data center 150, 250, such as any of the route/crew manifest component 124, 224, the weather component 126, 226, the map component 164, 264, and any additional data signals. The data encoder 122, 222 compresses or encodes the data and time synchronizes the data in order to facilitate efficient real-time transmission and replication to a remote data repository 130, 230. The data encoder 122, 222 transmits the encoded data to the onboard data manager 120, 220 which then saves the encoded data in the crash hardened memory module 118, 218 and the queuing repository 158, 258 for replication to the remote data repository 130, 230 via a remote data manager 132, 232 located in the data center 150, 250. Optionally, the onboard data manager 120, 220 can save a tertiary copy of the encoded data in the non-crash hardened removable storage device 219 of the second embodiment shown in FIG. 2. The onboard data manager 120, 220 and the remote data manager 132, 232 work in unison to manage the data replication process. A single remote data manager 132, 232 in the data center 150, 250 can manage the replication of data from a plurality of assets 148, 248.

The data from the various input components and data from an in-cab audio/graphic user interface (GUI) 160, 260 are sent to a vehicle event detector 156, 256. The vehicle event detector 156, 256 processes the data to determine whether an event, incident or other predefined situation involving the asset 148, 248 has occurred. When the vehicle event detector 156, 256 detects signals that indicate a predefined event occurred, the vehicle event detector 156, 256 sends the processed data that a predefined event occurred along with supporting data surrounding the predefined event to the onboard data manager 120, 220. The vehicle event detector 156, 256 detects events based on data from a wide variety of sources, such as the analog inputs 102, 202, the digital inputs 104, 204, the I/O module 106, 206, the vehicle controller 108, 208, the engine controller 110, 210, the inertial sensors 112, 212, the GPS 114, 214, the cameras 116, 216, the route/crew manifest component 124, 224, the weather component 126, 226, the map component 164, 264, the PTC/signal data 166, 266, and the fuel data 168, 268, which can vary based on the asset's configuration. When the vehicle event detector 156, 256 detects an event, the detected asset event information is stored in a queuing repository 158, 258 and can optionally be presented to the crew of the asset 148, 248 via the in-cab audio/graphical user interface (GUI) 160, 260.

The onboard data manager 120, 220 also sends data to the queuing repository 158. In near real-time mode, the onboard data manager 120, 220 stores the encoded data received from the data encoder 122, 222 and any event information in the crash hardened memory module 118, 218 and in the queueing repository 158, 258. In the second embodiment of FIG. 2, the onboard data manager 220 can optionally store the encoded data in the non-crash hardened removable storage device 219. After five minutes of encoded data has accumulated in the queuing repository 158, 258, the onboard data manager 120, 220 stores the five minutes of encoded data to the remote data repository 130, 230 via the remote data manager 132, 232 in the data center 150, 250 over the wireless data link 146, 256 accessed through the wireless gateway/router 172, 272. In real-time mode, the onboard data manager 120, 220 stores the encoded data received from the data encoder 122, 222 and any event information to the crash hardened memory module 118, 218, and optionally in the non-crash hardened removable storage device 219 of FIG. 2, and to the remote data repository 130, 230 via the remote data manager 132, 232 in the data center 150, 250 over the wireless data link 146, 246 accessed through the wireless gateway/router 172, 272. The onboard data manager 120, 220 and the remote data manager 132, 232 can communicate over a variety of wireless communications links, such as Wi-Fi, cellular, satellite, and private wireless systems utilizing the wireless gateway/router 172, 272. Wireless data link 146, 246 can be, for example, a wireless local area network (WLAN), wireless metropolitan area network (WMAN), wireless wide area network (WWAN), a private wireless system, a cellular telephone network or any other means of transferring data from the data recorder 154, 254 of DARS 100, 200 to, in this example, the remote data manager 130, 230 of DARS 100, 200. When a wireless data connection is not available, the data is stored in memory and queued in queueing repository 158, 258 until wireless connectivity is restored and the data replication process can resume.

In parallel with data recording, data recorder 154, 254 continuously and autonomously replicates data to the remote data repository 130, 230. The replication process has two modes, a real-time mode and a near real-time mode. In real-time mode, the data is replicated to the remote data repository 130, 230 every second. In near real-time mode, the data is replicated to the remote data repository 130, 230 every five minutes. The rate used for near real-time mode is configurable and the rate used for real-time mode can be adjusted to support high resolution data by replicating data to the remote data repository 130, 230 every 0.10 seconds. When the DARS 100, 200 is in near real-time mode, the onboard data manager 120, 220 queues data in the queuing repository 158, 258 before replicating the data to the remote data manager 132, 232. The onboard data manager 120, 220 also replicates the vehicle event detector information queued in the queueing repository 158, 258 to the remote data manager 132, 232. Near real-time mode is used during normal operation, under most conditions, in order to improve the efficiency of the data replication process.

Real-time mode can be initiated based on events occurring and detected by the vehicle event detector 156, 256 onboard the asset 148, 248 or by a request initiated from the data center 150, 250. A typical data center 150, 250 initiated request for real-time mode is initiated when a remotely located user 152, 252 has requested real-time information from a web client 142, 242. A typical reason for real-time mode to originate onboard the asset 148, 248 is the detection of an event or incident by the vehicle event detector 156, 256 such as an operator initiating an emergency stop request, emergency braking activity, rapid acceleration or deceleration in any axis, or loss of input power to the data recorder 154, 254. When transitioning from near real-time mode to real-time mode, all data not yet replicated to the remote data repository 130, 230 is replicated and stored in the remote data repository 130, 230 and then live replication is initiated. The transition between near real-time mode and real-time mode typically occurs in less than five seconds. After a predetermined amount of time has passed since the event or incident, a predetermined amount of time of inactivity, or when the user 152, 252 no longer desires real-time information from the asset 148, 248, the data recorder 154, 254 reverts to near real-time mode. The predetermined amount of time required to initiate the transition is configurable and is typically set to ten minutes.

When the data recorder 154, 254 is in real-time mode, the onboard data manager 120, 220 attempts to continuously empty its queue to the remote data manager 132, 232, storing the data to the crash hardened memory module 118, 218, and optionally to the non-crash hardened removable storage device 219 of FIG. 2, and sending the data to the remote data manager 132, 232 simultaneously. The onboard data manager 120, 220 also sends the detected vehicle information queued in the queuing repository 158, 258 to the remote data manager 132, 232.

Upon receiving data to be replicated from the data recorder 154, 254, along with data from the map component 164, 264, the route/crew manifest component 124, 224, and the weather component 126, 226, the remote data manager 132, 232 stores the compressed data to the remote data repository 130, 230 in the data center 150, 250 of DARS 100, 200. The remote data repository 130, 230 can be, for example, cloud-based data storage or any other suitable remote data storage. When data is received, a process is initiated that causes a data decoder 136, 236 to decode the recently replicated data for/from the remote data repository 130, 230 and send the decoded data to a remote event detector 134, 234. The remote data manager 132, 232 stores vehicle event information in the remote data repository 130, 230. When the remote event detector 134, 234 receives the decoded data, it processes the decoded data to determine if an event of interest is found in the decoded data. The decoded information is then used by the remote event detector 134, 234 to detect events, incidents, or other predefined situations, in the data occurring with the asset 148, 248. Upon detecting an event of interest from the decoded data, the remote event detector 134, 234 stores the event information and supporting data in the remote data repository 130, 230. When the remote data manager 132, 232 receives remote event detector 134, 234 information, the remote data manager 132, 232 stores the information in the remote data repository 130, 230.

The remotely located user 152, 252 can access information, including vehicle event detector information, relating to the specific asset 148, 248, or a plurality of assets, using the standard web client 142, 242, such as a web browser, or a virtual reality device (not shown) which, in this implementation, can display thumbnail images from selected cameras. The web client 142, 242 communicates the user's 152, 252 request for information to a web server 140, 240 through a network 144, 244 using common web standards, protocols, and techniques. Network 144, 244 can be, for example, the Internet. Network 144, 244 can also be a local area network (LAN), metropolitan area network (MAN), wide area network (WAN), virtual private network (VPN), a cellular telephone network or any other means of transferring data from the web server 140, 240 to, in this example, the web client 142, 242. The web server 140, 240 requests the desired data from the data decoder 136, 236. The data decoder 136, 236 obtains the requested data relating to the specific asset 148, 248, or a plurality of assets, from the remote data repository 130, 230 upon request from the web server 140, 240. The data decoder 136, 236 decodes the requested data and sends the decoded data to a localizer 138, 238. Localization is the process of converting data to formats desired by the end user, such as converting the data to the user's preferred language and units of measure. The localizer 138, 238 identifies the profile settings set by user 152, 252 by accessing the web client 142, 242 and uses the profile settings to prepare the information being sent to the web client 142, 242 for presentation to the user 152, 252, as the raw encoded data and detected event information is saved to the remote data repository 130, 230 using coordinated universal time (UTC) and international system of units (SI units). The localizer 138, 238 converts the decoded data into a format desired by the user 152, 252, such as the user's 152, 252 preferred language and units of measure. The localizer 138, 238 sends the localized data in the user's 152, 252 preferred format to the web server 140, 240 as requested. The web server 140, 240 then sends the localized data of the asset, or plurality of assets, to the web client 142, 242 for viewing and analysis, providing playback and real-time display of standard video and 360 degree video. The web client 142, 242 can display and the user 152, 252 can view the data, video, and audio for a single asset or simultaneously view the data, video, and audio for a plurality of assets. The web client 142, 242 can also provide synchronous playback and real-time display of data along with the plurality of video and audio data from both standard and 360 degree video sources on, in, or in the vicinity of the asset, nearby assets, and/or remotely located sites.

Figure 3:
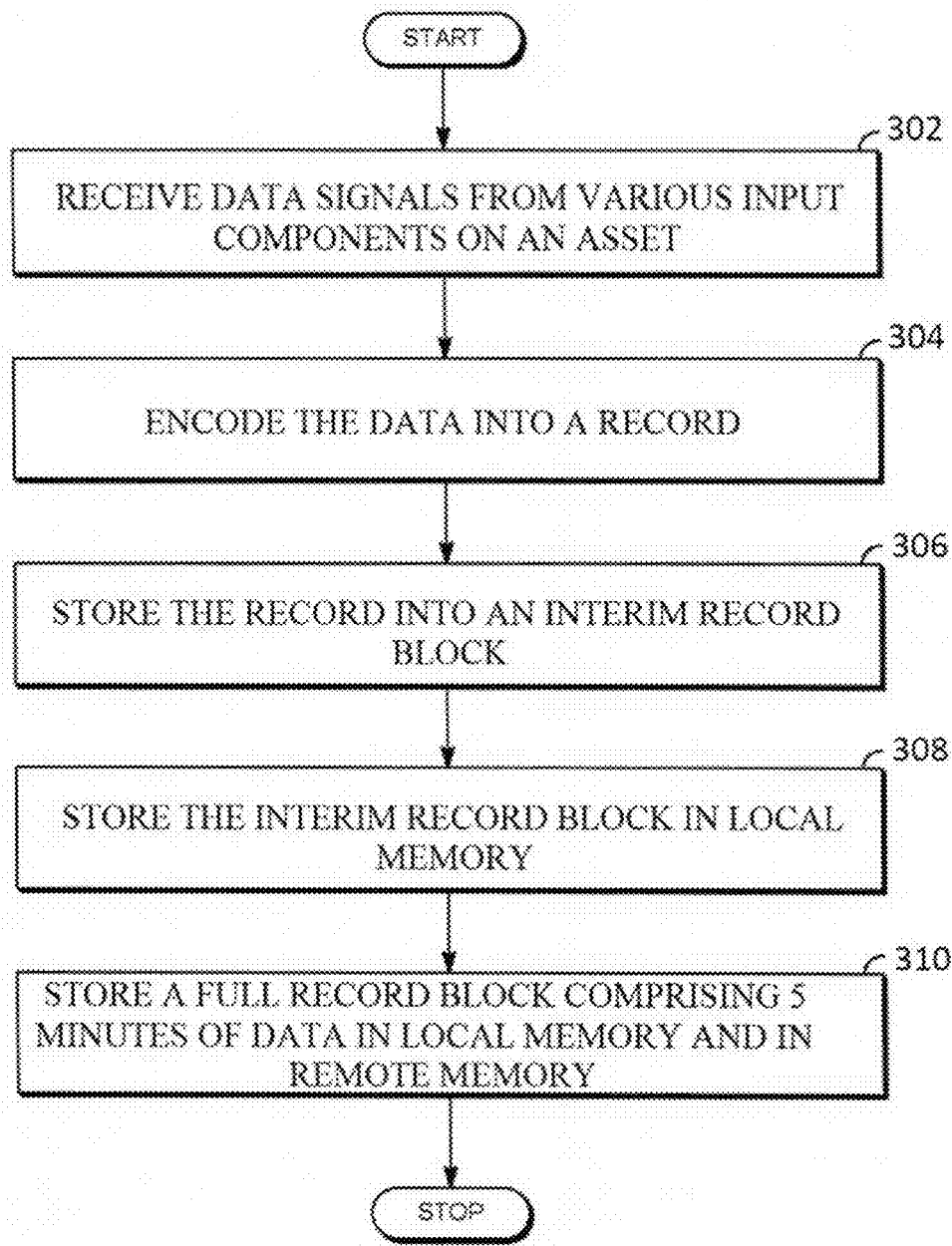
FIG. 3 is a flow diagram of a process for recording data and/or information from a mobile asset in accordance with implementations of this disclosure.

FIG. 3 is a flow diagram showing a process 300 for recording data and/or information from the asset 148, 248 in accordance with an implementation of this disclosure. Data recorder 154, 254 receives data signals from various input components that include physical or calculated data elements from the asset 148, 248 and data center 150, 250, such as speed, latitude coordinates, longitude coordinates, horn detection, throttle position, weather data, map data, or crew data 302. Data encoder 122, 222 creates a record that includes a structured series of bits used to configure and record the data signal information 304. The encoded record is then sent to the onboard data manager 120, 220 that sequentially combines a series of records in chronological order into record blocks that include up to five minutes of data 306. An interim record block includes less than five minutes of data while a full record block includes a full five minutes of data. Each record block includes all the data required to fully decode the included signals, including a data integrity check. At a minimum, a record block must start with a start record and end with an end record.

In order to ensure that all of the encoded signal data is saved to the crash hardened memory module 118, and optionally to the non-crash hardened removable storage device 219 of FIG. 2, should the data recorder 154, 254 lose power or be subjected to extreme temperatures or mechanical stresses due to a collision or other catastrophic event, the onboard data manager 120, 220 stores interim record blocks in the crash hardened memory module 118 at a predetermined rate 308, and optionally in the non-crash hardened removable storage device 219 of FIG. 2, where the predetermined rate is configurable and/or variable, as shown in FIG. 5 in an exemplary representation. Interim record blocks are saved at least once per second but can also be saved as frequently as once every tenth of a second. The rate at which interim record blocks are saved depends on the sampling rates of each signal. Every interim record block includes the full set of records since the last full record block. Data recorder 154, 254 can alternate between two temporary storage locations in the crash hardened memory module 118, 218, and optionally in the non-crash hardened removable storage device 219 of FIG. 2, when recording each interim record block to prevent the corruption or loss of more than one second of data when the data recorder 154, 254 loses power while storing data to the crash hardened memory module 118, 218 or the optional non-crash hardened removable storage device 219 of the data recorder 254 of FIG. 2. Each time a new interim record block is saved to a temporary crash hardened memory location it will overwrite the existing previously stored interim record block in that location.

Figure 7:
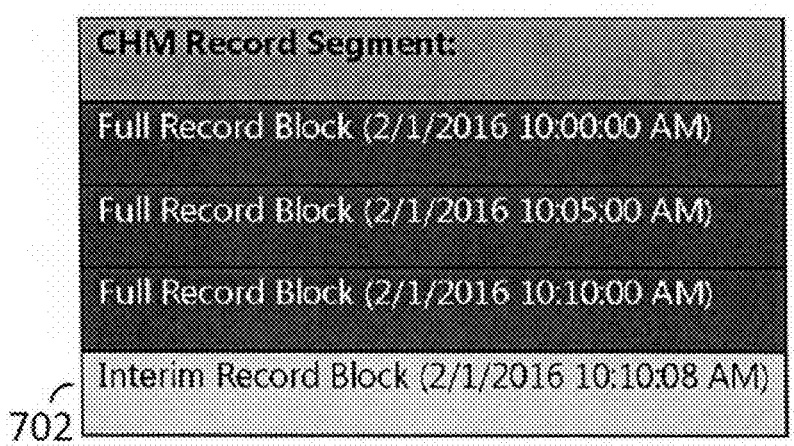
FIG. 7 is a diagram that illustrates an exemplary record segment in the crash hardened memory module after power has been restored in accordance with implementations of this disclosure.

Every five minutes, in this implementation, when the data recorder 154, 254 is in near real-time mode, the onboard data manager 120, 220 stores a full record block including the last five minutes of encoded signal data into a record segment in the crash hardened memory module 118, 218, shown in FIG. 7, and sends a copy of the full record block to the remote data manager 132, 232 to be stored in the remote data repository 130, 230 for a predetermined retention period such as two years 310. The crash hardened memory module 118, 218, and/or the optional non-crash hardened removable storage device 219 of the data recorder 254 of FIG. 2, stores a record segment of the most recent record blocks for a mandated storage duration, which in this implementation is the federally mandated duration that the data recorder 154, 254 must store operational or video data in the crash hardened memory module 118, 218 with an additional 24 hour buffer, and is then overwritten.

Figure 4:
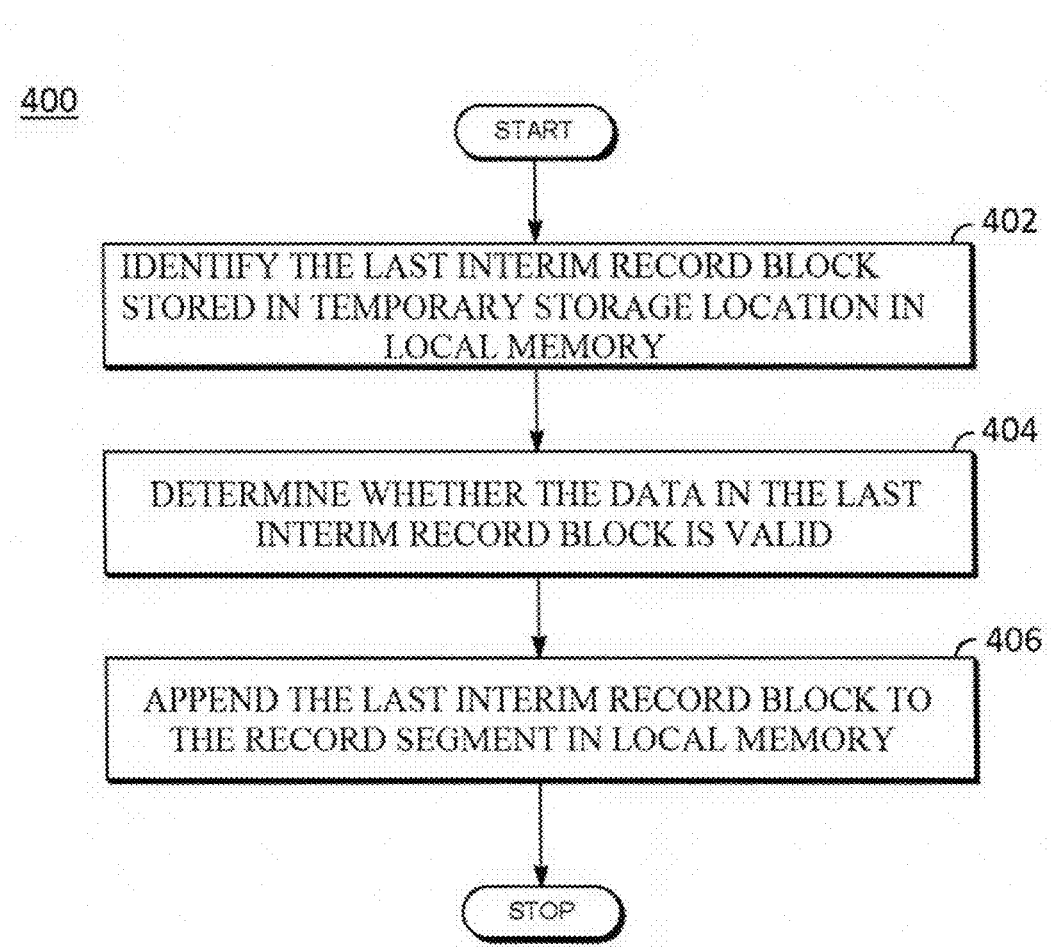
FIG. 4 is a flow diagram of a process for appending data and/or information from the mobile asset after a power outage in accordance with implementations of this disclosure.

FIG. 4 is a flow diagram showing a process 400 for appending data and/or information from the asset 148, 248 after a power outage in accordance with an implementation of this disclosure. Once power is restored, the data recorder 154, 254 identifies the last interim record block that was stored in one of the two temporary crash hardened memory locations 402 and validates the last interim record block using the 32 bit cyclic redundancy check that is included in the end record of every record block 404. The validated interim record block is then appended to the crash hardened memory record segment and that record segment, which can contain up to five minutes of data prior to the power loss, is sent to the remote data manager 132, 232 to be stored for the retention period 406. The encoded signal data is stored to the crash hardened memory module 118, 218, and/or the optional non-crash hardened removable storage device 219 of the data recorder 254 of FIG. 2, in a circular buffer of the mandated storage duration. Since the crash hardened memory record segment is broken up into multiple record blocks, the data recorder 154, 254 removes older record blocks when necessary to free up memory space each time a full record block is saved to crash hardened memory module 118, 218, and/or the optional non-crash hardened removable storage device 219 of the data recorder 254 of FIG. 2.

FIG. 6 is a diagram that illustrates exemplary interim record blocks prior to a loss of power and after restoration of power to the data recorder 154, 254. When the interim record block stored in temporary location 2 at (Feb. 1, 2016 10:10:08 AM) 602 is valid, that interim record block is appended to the record segment 702 (FIG. 7) in the crash hardened memory module 118, 218, and/or the optional non-crash hardened removable storage device 219 of the data recorder 254 of FIG. 2, as shown in FIG. 7. When the interim record block stored in temporary location 2 at (Feb. 1, 2016 10:10:08 AM) is not valid, the interim record block in temporary location 1 at (Feb. 1, 2016 10:10:07 AM) is validated and, if valid, is appended to the record segment in the crash hardened memory module 118, 218, and/or the optional non-crash hardened removable storage device 219 of the data recorder 254 of FIG. 2.

Whenever any record block needs to be saved in crash hardened memory module 118, 218, and/or the optional non-crash hardened removable storage device 219 of the data recorder 254 of FIG. 2, the record segment is flushed to the disk immediately. Since the data recorder 154, 254 alternates between two different temporary storage locations when saving interim record blocks, there is always one temporary storage location that is not being modified or flushed to crash hardened memory or non-crash hardened removable storage device, thereby ensuring that at least one of the two interim record blocks stored in the temporary storage locations is valid and that the data recorder 154, 254 will not lose more than one second at most of data whenever the data recorder 154, 254 loses power. Similarly, when the data recorder 154, 254 is writing data to the crash hardened memory module 118, 218, and/or the optional non-crash hardened removable storage device 219 of the data recorder 254 of FIG. 2, every tenth of a second, the data recorder 154, 254 will not lose more than one tenth of a second at most of data whenever the data recorder 154, 254 loses power.

For simplicity of explanation, process 300 and process 400 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

While the present disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed:

1. A method for processing, storing, and transmitting data from a mobile asset comprising:
receiving, using a data recorder onboard the mobile asset, data based on at least one data signal from at least one of:
at least one data source onboard the mobile asset; and
at least one data source remote from the mobile asset;
encoding, using a data encoder of the data recorder, a record comprising a bit stream based on the data;
appending, using an onboard data manager of the data recorder, the record to a record block; and
storing, using the onboard data manager, the record block at a configurable first predetermined rate in at least one local memory component of the data recorder and a queueing repository of the data recorder.

2. The method of claim 1, wherein the at least one data source onboard the mobile asset includes at least one of analog inputs, digital inputs, input and output modules, vehicle controller, engine controller, inertial sensors, global positioning system, at least one camera, fuel data, and positive train control (PTC) signal data, and wherein the at least one data source remote from the mobile asset includes at least one of map components, route and crew manifest component, and weather component.

3. The method of claim 1, wherein the data includes at least one of speed, pressure, temperature, current, voltage, acceleration from the mobile asset, acceleration from remote mobile assets, switch positions, actuator positions, warning light illumination, actuator commands, position, altitude, internally generated information, video information, audio information, route, schedule, cargo manifest information, environmental conditions, current weather conditions, and forecasted weather conditions.

4. The method of claim 1, further comprising:
identifying, using a vehicle event detector of the data recorder, a predefined event based on at least one of the data and multimedia data from an in cab audio and graphical user interface (GUI) onboard the mobile asset on a condition that the predefined event occurred involving the mobile asset;
storing, using the vehicle event detector, the predefined event, data, and multimedia data in the queueing repository on the condition that the predefined event occurred involving the mobile asset; and
sending, using the vehicle event recorder, the predefined event, data, and multimedia data to the onboard data manager on the condition that the predefined event occurred involving the mobile asset.

5. The method of claim 4, wherein the predefined event is at least one of an operator of the mobile asset initiating an emergency stop request, emergency braking activity, rapid acceleration of the asset in any axis, rapid deceleration of the asset in any axis, and loss of input power to the data recorder.

6. The method of claim 4, further comprising:
displaying, using the in cab audio and GUI onboard the mobile asset, at least one of the predefined event, data, and multimedia data.

7. The method of claim 1, wherein the at least one local memory component comprises at least one of a crash hardened memory module and a non-crash hardened removable storage device.

8. The method of claim 1, wherein the record block is stored in one of at least 2 temporary storage locations of the at least one local memory component.

9. The method of claim 1, wherein storing the record block to the at least one local memory component comprises one of:
storing the record block in a first temporary storage location of the at least one local memory component on a condition that a previous record block was stored in a second temporary storage location of the at least one local memory component; and
storing the record block in the second temporary storage location of the at least one local memory component on a condition that the previous record block was stored in the first temporary storage location of the at least one local memory component.

10. The method of claim 1, wherein the data recorder receives the data from the at least one data source onboard the mobile asset via at least one of a wireless data link and a wired data link onboard the mobile asset.

11. The method of claim 10, further comprising:
receiving, using at least one of an Ethernet switch and power of Ethernet of the data recorder, the data from the at least one of the wireless data link and the wired data link.

12. The method of claim 1, wherein the data recorder receives the data from the at least one data source remote from the mobile asset via a wireless data link.

13. The method of claim 12, further comprising:
receiving, using at least one of a wireless gateway and a wireless router of the data recorder, the data from the wireless data link.

14. The method of claim 1, further comprises:
time synchronizing, using the data encoder, the record.

15. The method of claim 1, further comprising:
sending, using the onboard data manager, the record block to a remote data manager via a wireless data link at a configurable second predetermined rate, wherein the second predetermined rate is in the range between zero and one second; and
storing, using the remote data manager, the record block to a remote data repository.

16. The method of claim 10, further comprising:
decoding, using the data decoder, the record block into decoded data;
identifying, using a remote event detector, a predefined event based on the decoded data on a condition that the predefined event occurred involving the mobile asset; and
storing, using the remote event detector, the predefined event and decoded data in the remote data repository on the condition that the predefined event occurred involving the mobile asset.

17. The method of claim 1, further comprising:
appending the record block to a record segment; and
storing, using the onboard data manager, the record segment to the at least one local memory component on a condition that the record segment includes a predetermined amount of record blocks comprising at least one record block.

18. The method of claim 17, further comprising:
sending, using the onboard data manager, a full record block to a remote data manager via a wireless data link at a configurable second predetermined rate, the full record block comprising at least one record segment.

19. The method of claim 18, wherein the second predetermined rate is in the range of zero to five minutes.

20. The method of claim 17, further comprising:
storing, using the remote data manager, the full record block in a remote data repository.

21. The method of claim 18, wherein the full record block is sent to the remote data manager via the wireless data link at the configurable second predetermined rate, wherein the second predetermined rate is in the range of zero to one second on a condition that the data recorder is in real-time mode.

22. The method of claim 18, wherein the full record block is sent to the remote memory component at the configurable second predetermined rate, wherein the second predetermined rate is in the range of zero to five minutes on a condition that the data recorder is in near real-time mode.

23. A method for processing, storing, and transmitting data from a mobile asset comprising:
receiving data signals from at least one input sensor onboard the mobile asset;
encoding a record comprising a bitstream based on the data signals;
appending the record to a record block comprising a plurality of records;
storing the record block to at least one local memory component onboard the mobile asset; and
storing the record block to a remote memory component on a condition that the plurality of records comprises a predetermined amount of data.

24. The method of claim 23, wherein the predetermined amount of data comprises five minutes of data.

25. The method of claim 23, wherein the record block is stored to the at least one local memory component at least once a second.

26. The method of claim 23, wherein the record block is stored to the at least one local memory component every tenth of a second.

27. The method of claim 23, further comprising:
identifying event information based on the record on a condition that the record comprises a predefined event; and
storing the event information in the at least one local memory component.

28. A system for processing, storing, and transmitting data from a mobile asset comprising:
a data recorder onboard the mobile asset comprising at least one local memory component, a data encoder, an onboard data manager, and a queueing repository, the data recorder configured to receive data based on at least one data signal from at least one of:
at least one data source onboard the mobile asset; and
at least one data source remote from the mobile asset;
the data encoder configured to encode a record comprising a bit stream based on the data; and
the onboard data manager configured to:
append the record to a record block; and
store the record block at a configurable first predetermined rate in the at least one local memory component and the queueing repository.

29. The system of claim 28, wherein the at least one data source onboard the mobile asset includes at least one of analog inputs, digital inputs, input and output modules, vehicle controller, engine controller, inertial sensors, global positioning system, at least one camera, fuel data, and positive train control (PTC) signal data, and wherein the at least one data source remote from the mobile asset includes at least one of map components, route and crew manifest component, and weather component.

30. The system of claim 28, wherein the data includes at least one of speed, pressure, temperature, current, voltage, acceleration from the mobile asset, acceleration from remote mobile assets, switch positions, actuator positions, warning light illumination, actuator commands, position, altitude, internally generated information, video information, audio information, route, schedule, cargo manifest information, environmental conditions, current weather conditions, and forecasted weather conditions.

31. The system of claim 28, further comprising:
a vehicle event detector of the data encoder, the vehicle event detector configured to:
identify a predefined event based on at least one of the data and multimedia data from an in cab audio and graphical user interface (GUI) onboard the mobile asset on a condition that the predefined event occurred involving the mobile asset;
store the predefined event, data, and multimedia data in the queueing repository on the condition that the predefined event occurred involving the mobile asset; and
send the predefined event, data, and multimedia data to the onboard data manager on the condition that the predefined event occurred involving the mobile asset.

32. The system of claim 31, wherein the predefined event is at least one of an operator of the mobile asset initiating an emergency stop request, emergency braking activity, rapid acceleration of the asset in any axis, rapid deceleration of the asset in any axis, or loss of input power to the data recorder.

33. The system of claim 31, wherein the in cab audio and GUI onboard the mobile asset displays at least one of the predefined event, data, and multimedia data.

34. The system of claim 28, wherein the at least one local memory component comprises at least one of a crash hardened memory module and a non-crash hardened removable storage device.

35. The system of claim 28, wherein the record block is stored in one of at least 2 temporary storage locations of the at least one local memory component.

36. The system of claim 28, wherein the onboard data manager is configured to:
store the record block in a first temporary storage location of the at least one local memory component on a condition that a previous record block was stored in a second temporary storage location of the at least one local memory component; and
store the record block in the second temporary storage location of the at least one local memory component on a condition that a previous record block was stored in the first temporary storage location of the at least one local memory component.

37. The system of claim 28, further comprising:
at least one of a wireless data link and a wired data link onboard the mobile asset, wherein the at least one of the wireless data link and the wired data link is configured to receive the data from the at least one data source onboard the mobile asset.

38. The system of claim 36, further comprising:
at least one of an Ethernet switch and power of Ethernet of the data recorder, the at least one of the Ethernet switch and power over Ethernet receives the data from the at least one of the wireless data link and the wired data link.

39. The system of claim 28, further comprising:
at least one wireless data link configured to receive the data from the at least one data source remote from the mobile asset.

40. The system of claim 28, further comprising:
at least one of a wireless gateway and a wireless router of the data recorder, the at least one of the wireless gateway and the wireless router configured to receive the data from the wireless data link.

41. The system of claim 28, wherein the data encoder is configured to time synchronize the data in the record.

42. The system of claim 28, wherein the onboard data manager is configured to:
send the record block to a remote data manager via a wireless data link at a configurable second predetermined rate, wherein the second predetermined rate is in the range between zero and one second; and
store the record block to a remote data repository.

43. The system of claim 28, further comprising:
a remote data decoder configured to decode the record block into decoded data; and
a remote event detector configured to:
identify a predefined event based on the decoded data on a condition that the predefined event occurred involving the mobile asset; and
store the predefined event and decoded data in the remote data repository on the condition that the predefined event occurred involving the mobile asset.

44. The system of claim 28, wherein the onboard data manager is configured to:

append the record block to a record segment; and
store the record segment to the at least one local memory component on a condition that the record segment includes a predetermined amount of record blocks comprising at least one record block.

45. The system of claim 44, wherein the onboard data manager is configured to:
send a full record block to a remote data manager via a wireless data link at a configurable second predetermined rate, the full record block comprising at least one record segment.

46. The system of claim 45, wherein the second predetermined rate is in the range of zero to five minutes.

47. The system of claim 45, wherein the remote data manager is configured to store the full record block in a remote data repository.

48. The system of claim 45, wherein the full record block is sent to the remote data manager via the wireless data link at the configurable second predetermined rate, wherein the second predetermined rate is in the range of zero to one second on a condition that the data recorder is in real-time mode.

49. The system of claim 45, wherein the full record block is sent to the remote memory component at the configurable second predetermined rate, wherein the second predetermined rate is in the range of zero to five minutes on a condition that the data recorder is in near real-time mode.

50. A system for processing, storing, and transmitting data from a mobile asset comprising:
a data encoder configured to receive data signals from at least one input sensor onboard the mobile asset and compress the data signals into a record comprising a bitstream; and
an onboard data manager configured to:
append the record to a record block comprising a plurality of records;
store the record block in a crash hardened memory component onboard the mobile asset; and
store the record block to a remote memory component on a condition that the plurality of records comprises a predetermined amount of data.

51. The system of claim 50, further comprising:
a vehicle event detector configured to identify event information based on the record on a condition that the record comprises a predefined event; and
the onboard data manager configured to store the event information and the record block in the crash hardened memory component and the remote memory component.

52. The system of claim 50, wherein the predetermined amount of data comprises five minutes of data.

53. The system of claim 50, wherein the record block is stored to the crash hardened memory component at least once a second.

54. The system of claim 50, wherein the record block is stored to the crash hardened memory component every tenth of a second.

* * * * *

UNITED STATES PATENT AND TRADEMARK OFFICE
CERTIFICATE OF CORRECTION

PATENT NO.         : 9,934,623 B2
APPLICATION NO.    : 15/595650
DATED              : April 3, 2018
INVENTOR(S)        : Lawrence B. Jordan and Mathew Hamsmith It is certified that error appears in the above-identified patent and that said Letters Patent is hereby corrected as shown below:

On the Title Page

Item (72), "Mathew Hamsmith" should be -- Matthew D. Hamsmith --.

Signed and Sealed this
Second Day of July, 2019

Andrei Iancu
*Director of the United States Patent and Trademark Office*